United States Patent
Da Silva Monteiro Bastos et al.

(10) Patent No.: US 10,653,139 B2
(45) Date of Patent: May 19, 2020

(54) DEVICE FOR STORED PRODUCTS PROTECTION AND USES THEREOF

(71) Applicants: UNIVERSIDADE DO PORTO, Oporto (PT); INSTITUTO SUPERIOR DE AGRONOMIA, Lisbon (PT); INSTITUTO NACIONAL DE INVESTIGAÇÃO AGRÁRIA E VETERINÁRIA, Nova Oeiras Oeiras (PT)

(72) Inventors: Margarida Maria Da Silva Monteiro Bastos, Oporto (PT); Fernão Domingos De Montenegro Baptista Malheiro De Magalhaes, Oporto (PT); José Manuel Ribeiro De Sousa, Oporto (PT); Carlos Filipe Gonçalves Pires Da Silva, Oporto (PT); Joana Vieira De Freitas Barbosa, Oporto (PT); António Maria Marques Mexia, Lisbon (PT); Ana Maria Da Costa Aldir Magro, Lisbon (PT); Maria Da Graça Fraga Freire De Barros Barbosa Maia, Lisbon (PT); Cláudia Verónica Sánchez Lara, Nova Oeiras Oeiras (PT); José Manuel Ferreira Nobre Semedo, Nova Oeiras Oeiras (PT); Maria Manuela Roldão De Oliveira, Nova Oeiras Oeiras (PT); Olivia Cruz De Matos, Nova Oeiras Oeiras (PT)

(73) Assignees: UNIVERSIDADE DO PORTO, Oporto (PT); INSTITUTO SUPERIOR DE AGRONOMIA, Lisbon (PT); INSTITUTO NACIONAL DE INVESTIGAÇÃO AGRÁRIA E VETERINÁRIA, Nova Oeiras Oeiras (PT)

( * ) Notice: Subject to any disclaimer, the term of this patent is extended or adjusted under 35 U.S.C. 154(b) by 8 days.

(21) Appl. No.: 15/772,176
(22) PCT Filed: Oct. 30, 2015
(86) PCT No.: PCT/IB2015/058421
§ 371 (c)(1),
(2) Date: Apr. 30, 2018

(87) PCT Pub. No.: WO2017/072563
PCT Pub. Date: May 4, 2017

(65) Prior Publication Data
US 2018/0310556 A1 Nov. 1, 2018

(30) Foreign Application Priority Data
Oct. 29, 2015 (PT) .................................. 108920

(51) Int. Cl.
*A01N 31/00* (2006.01)
*A01N 35/06* (2006.01)
(Continued)

(52) U.S. Cl.
CPC ............. *A01N 35/06* (2013.01); *A01N 25/18* (2013.01); *A01N 31/16* (2013.01); *A01N 65/22* (2013.01);
(Continued)

(58) Field of Classification Search
CPC .................................................... A01N 31/00
See application file for complete search history.

(56) References Cited

U.S. PATENT DOCUMENTS

2003/0091661 A1    5/2003   Bessette
2008/0075796 A1*   3/2008   Enan ................. A01N 43/30
                                                    424/731
(Continued)

FOREIGN PATENT DOCUMENTS

CN        102388958        3/2012
WO        WO2001000049     1/2001
WO        WO2001010214     2/2001

OTHER PUBLICATIONS

Rajendran et al, "Plant products as fumigants for stored-product insect control", Journal of Stored Products Research, Pergamon Press, Oxford, GB, (Oct. 18, 2007), vol. 44, No. 2, doi:10.1016/J.JSPR.2007.08.003, ISSN 0022-474X, pp. 126-135, 2008.
(Continued)

*Primary Examiner* — Rosanne Kosson
(74) *Attorney, Agent, or Firm* — Leason Ellis LLP

(57) ABSTRACT

The present disclosure relates to a method for protecting stored agricultural dry products during storage, consisting of
(Continued)

a controlled release system of essential oils and a shell for allowing oil diffusion in vapour phase towards the outer atmosphere without direct contact of the support material with stored products. This system is characterized by being suitable for use within containers for protecting stored dried agricultural plant products for a long period of time, in particular more than 4 weeks, more preferably more than 8 or 12 weeks.

8 Claims, 7 Drawing Sheets

(51) Int. Cl.
*A01N 31/16* (2006.01)
*A01N 25/18* (2006.01)
*A23L 3/3409* (2006.01)
*A01N 65/22* (2009.01)
*A01N 65/28* (2009.01)
*A23B 7/144* (2006.01)
*A23B 9/18* (2006.01)

(52) U.S. Cl.
CPC .............. *A01N 65/28* (2013.01); *A23B 7/144* (2013.01); *A23B 9/18* (2013.01); *A23L 3/3409* (2013.01); *A23V 2002/00* (2013.01)

(56) References Cited

U.S. PATENT DOCUMENTS

2008/0175926 A1  7/2008  Bompeix et al.
2013/0295153 A1  11/2013  Miresmailli et al.

OTHER PUBLICATIONS

S. G. Perez et al, "Activity of essential oils as a biorational alternative to control coleopteran insects in stored grains", Journal of Medicinal Plants Research, (Dec. 1, 2010), vol. 4, No. 25, pp. 2827-2835, 2010.

L Zeng et al, "Study on the insecticidal activity compounds of the essential oil from Syzygium aromaticum against stored grain insect pests", Julius-Kühn-Archiv, doi:10.5073/jka.2010.425.237, (Sep. 1, 2010), pp. 766-771, URL: http://pub.jki.bund.de/index.php/JKA/article/viewFile/590/1307, (Apr. 6, 2016), 2010.

Graca Barros et al, "The use of Laurus nobilis and Mentha pulegium essential oils against Sitophilus zeamais (Coleoptera: Curculionidae) on stored maize", Revista De Ciencias Agrarias, (Jun. 1, 2015), vol. 38, No. 2, pp. 191-195, 2015.

Montes-Belmont R et al, "Control of Aspergillus Flavus in Maize With Plant Essential Oils and Their Components", Journal of Food Protection, International Association for Food Protection, US, (Jan. 1, 1998), vol. 61, No. 5, , pp. 616-619. 1998.

Lucia Da Cruz Cabral et. al, "Application of plant derived compounds to control fungal spoilage and mycotoxin production in foods", International Journal of Food Microbiology, (2013), vol. 166, pp. 1-14.

Essential Oil Database of National Institute of Plant Genome Research, URL: http://nipgr.res.in/Essoildb/index.html retrieved 2018.

Bluma, R. et al.., "Impact of volatile compounds generated by essential oils on Aspergillus section Flavi growth parameters and aflatoxin accumulation", J. Sci. Food Agric., (2009), vol. 89, No. 9, pp. 1473-1480.

Pitt, J. I.; Hocking, A. D., Fungi and food spoilage, Practical Classification of Fungi Springer, (2009), p. 1-19.

* cited by examiner

DEVICE FOR STORED PRODUCTS PROTECTION AND USES THEREOF

CROSS-REFERENCE TO RELATED APPLICATIONS

This application is a U.S. National Stage Application under 35 U.S.C. § 371 of International Patent Application No. PCT/IB2015/058421, filed Oct. 30, 2015, which claims priority to Portugal Application No. 108920, filed Oct. 29, 2015, which are hereby incorporated by reference in their respective entireties.

TECHNICAL FIELD

The present disclosure relates to a method for protecting stored agricultural dry products during storage, consisting of a controlled release system of essential oils and a shell for allowing oil diffusion in vapour phase towards the outer atmosphere without direct contact of the support material with stored products.

This system is characterized by being suitable for use within containers for protecting stored dried agricultural plant products for a long period of time, in particular more than 4 weeks.

BACKGROUND

Control of insects and microorganisms are of most importance for improving storage period of stored products.

The main antimicrobial preservation technologies used to preserve the overall quality of the food over certain duration, known as the shelf life are thermal processing, chilling and freezing, concentration, drying, ionizing radiation, chemical preservation, high hydrostatic pressure, pulsed electric field, and intense light.

Regarding the protection against insects physical, biotechnical, biological and chemical methods are involved.

The physical control is the manipulation of the physical environment so that insect populations do not increase or are reduced and eliminated. The physical attributes refer to temperature, relative humidity, moisture content, structures containing the commodity (silos, elevators, bags, packaging), forces on commodity (compression, impaction), inert dusts (diatomaceous earth), irradiation and packaging. Inert dusts control insects by damaging the cuticle and causing the insects to desiccate. Inert dusts are used to a limited extent commercially.

The main problems with the use of inert dusts are that they decrease the bulk density and flow ability of grain, are dusty to apply, and are ineffective in some cases. Gases are also a component of the physical environment. The main advantages are that they are not toxic to mammals and provide continued protection from insects. The hermetic storage of grain is one form of modified atmospheres by which grain itself through respiration creates an atmosphere rich in carbon dioxide and low oxygen. The atmospheres are modified to attain low oxygen environments by adding carbon dioxide, nitrogen, or burning the storage facility atmosphere and recirculating the combustion products. The term "controlled atmosphere" usually refers to the process of changing the atmosphere of a facility artificially by introducing $CO_2$ or $N_2$. In changing the atmosphere of a storage facility, we expect to create an environment that will not support insects or mycoflora in the storage facility.

The disadvantages of using modified atmospheres for insect control are the length of time required to obtain control as well as the cost of application and getting an adequate supply of gas to the treatment site. $CO_2$ can cause flavour deterioration.

Ambient air cooling is used mainly for control of insects in bulk grain storage. However, it has been also used in controlling insects in flour mills as an alternative to fumigation. Modified atmospheres have many advantages. They provide a way to eliminate insects from stored commodities without polluting the atmosphere and are safer than fumigants.

The biotechnical methods are related to traps with pheromones and traps with food baits which are not directly related to the object of present disclosure.

The biological control employs parasites, predators, or pathogens, microorganisms that cause disease and are distinguished by the fact that they are capable of reproducing after release, to suppress pest populations. It is important to understand that biological control can only be used as a prophylactic, not remedial, strategy, and that it will be most effective when integrated with other control strategies such as sanitation, fumigation, aeration, and packaging.

All insect pest populations tend to increase exponentially as long as there is adequate food, suitable environment, and no predators or parasites. Pest control has focused on the use of pesticides, exclusion (packaging), and adverse environmental conditions (desiccation, modified atmosphere, or temperatures extremes) to suppress stored product insects.

Most stored-product insect pests are probably not suitable for classic biological control, because their natural enemies have been distributed as widely as the pests.

The application of microbial agents for biological control of stored product pests is similar in technique and philosophy of use to the application of chemical protectants.

Further reductions of chemical control can be achieved by substituting biological and physical for chemical control methods. Decreased reliance on chemical control methods is the best resistance management program. Synthetic chemicals must be used to a lesser degree because of the concern about chemical residues on grain, worker safety, the environment, and insecticide-resistant populations. Extreme temperatures are currently the most widely used physical control method. Insects cannot grow and reproduce below 13° C. or above 35° C.

The main method by which storage fungi can be controlled is through drying and cooling. Chemical treatment to prevent fungal growth can only be used on grain for animal feed (FAO-www.fao.org/docrep/x5036e/x5036eOp.htm, site accessed at 24 Aug. 2015).

Modified atmospheres containing high $CO_2$ levels could also be employed and that $O_2$ should preferably be completely excluded for the protection of maize from fungal spoilage and mycotoxin contamination during the postharvest period.

Gamma irradiation can be used to prevent the growth of aflatoxigenic fungi and to reduce the $AFB_1$ levels in various goods intended for animal and human consumption, thus minimizing the animal and human exposure to this carcinogenic mycotoxin.

However, in low to medium scale of production mainly in developing countries synthetic fungicides are still used to control stored grains pests. The indiscriminate use of synthetic antifungals has led to the development of resistant strains which has necessitated utilization of higher concentrations, with the consequent increase in toxic residues in food products.

The salts of weak acids, such as sodium benzoate and potassium sorbate, can inhibit growth of several postharvest fungal pathogens. Using these compounds for fungal inhibition presents several benefits, such as their low mammalian toxicity, a wide spectrum of activity and relatively low cost. However, high concentrations of these compounds are needed to act as fungicides, bringing associated potential organoleptic changes [Lucía da Cruz Cabral, Virginia Fernández Pinto, Andrea Patriarca (2013). Application of plant derived compounds to control fungal spoilage and mycotoxin production in foods. International Journal of Food Microbiology, 166:1-14].

The indiscriminate and excessive use of fungicides in crops has been a major cause of the development of resistant pathogen populations, resulting in the use of higher concentrations of these antifungals and the consequent increase in toxic residues in food products. Some of these compounds are not biodegradable, so they can accumulate in soil, plants and water, and consequently affect humans through the food chain. Although chemical treatments have been considered to be the cheapest and most effective way to prevent postharvest diseases, the development of resistant microorganisms has reduced their acceptance. The type and concentration of fungicides allowed for postharvest application are restricted due to their long degradation period and potential effects on food and human health (carcinogenicity, teratogenicity, high and acute residual toxicity, hormonal imbalance and spermatotoxicity). Because of these undesirable effects, recent studies resulted in the revocation of registration of some of the more effective fungicides. Furthermore, public concern about food contamination with fungicidal residues has significantly increased. Considering all these factors, the development of new safe and biodegradable alternatives that are both effective and economically feasible is needed [Lucía da Cruz Cabral, Virginia Fernández Pinto, Andrea Patriarca (2013). Application of plant derived compounds to control fungal spoilage and mycotoxin production in foods. International Journal of Food Microbiology, 166:1-14].

Knowledge on biocidal properties of plant essential oils increased their relevance to solve problems of pest control in food stuff and food commodities. There are several reports of the use of essential oils in controlling pests of crops. The essential oils from aromatic plants have antiseptic and biocidal properties, potentially useful for the protection and conservation of foods, in particular applicable in increased shelf life strategies, as known in the prior art. However there are few reports of its use in food preservation, in particular food grain, dried, stored for long periods of storage.

The present disclosure relates to the use of essential oils rich in eugenol and pulegone. More specifically relates to essential oils from *Syzygium aromaticum* (clove) and *Mentha pulegium* (pennyroyal). The oils may be obtained by any of the methods known in the art (e.g. hydrodistillation, supercritical extraction). Some reports on the use of essential oils for food products stored are known. For instance the WO 2001000049 A1 and the US 20030091661 A1 describe methods to control pests, mites and beetles respectively, and affecting food stored products by the use of pesticides based on plant essential oils. However in both cases the pesticide is a fumigant applied by contact to foods within the containers or cartons where food products are stored.

This disclosure is not a fumigant and it should not be sprayed for contact action. The document CN102388958 describes a method for grain pest control using essential oils. However, its use in containers is not included. The objective of the present application is to contribute to solve the need for methods to protect stored products from pest thereby preserving the stored products inside closed containers of considerable dimension (over 60 L). Other studies related to repellence of spices are also known, even against *S. zeamais*; however repellence effects are not considered for the present objective.

The effects of plant oils based on repellence activity to avoid external contaminations in stored packaged foodstuff were also found, when applied only to very small capacity containers, based on a method very different from the present purposed system.

These facts are disclosed in order to illustrate the technical problem addressed by the present disclosure.

GENERAL DESCRIPTION

The present disclosure relates to a device ready to use in containers for stored products and to the use of said device.

The device of the present disclosure exploits the potential of essential oil vapours as an enhancer for the long-term protection of stored products during storage, using controlled release devices based on essential oils properties.

The present disclosure relates to the propagation of the essential oil vapours into the container atmosphere, until saturation is reached, securing the stored products stability throughout the storage period, without interference in the stored products safety and/or flavour or organoleptic properties.

One aspect of the present subject matter is related to the use of the essential oil as an enhancer for the long-term protection, in particular more than 4 weeks, of stored dried agricultural plant products, preferably more than 8 weeks, more preferably more than 12 weeks, even more preferably more than 20 weeks.

In an embodiment the essential oil may comprise a main active component in particular eugenol, pulegone, or mixtures thereof, preferably the concentration of eugenol, pulegone, or mixtures thereof in the essential oil of at least 40% (w/w, mass of active component/mass of essential oil).

In an embodiment the stored dried agricultural plant product may be selected from a list consisting of cereals, pulses, nuts and mixtures thereof, preferably the stored dried agricultural plant product may be selected from a list consisting of rice, beans, maize, rye, wheat, nuts and combinations thereof.

In an embodiment the essential oil is in a composition comprising an essential oil and an additive. Preferably the additive can be a stabilizer, an antioxidant, approved for food consumption, or a food dye, or natural food dye, or combinations thereof. More preferably the additive is selected from a list consisting of: 2 BHT (Butylated Hydroxytoluene), Ascorbyl palmitate, calcium disodium ethylenediamine-tetraacetate—EDTA; sorbic acid; 4-Hydroxymethyl-2,6-di-tert-butylphenol; monoglyceride citrate; THBP (2,4,5-trihydroxybutyrophenone); TBHQ (tertiary butylhydroquinone); 2,4,5-Trihydroxybutyrophenone (THBP); and combinations thereof.

One aspect of the present subject-matter is related to a device for long-term storage of dried agricultural plant products comprising:
  a support material for storing and allowing a long-term release of an essential oil;
  a perforated external shell for preventing contact of the essential oil with the dried agricultural plant products and enabling the oil vapour diffusion,
  wherein the support material is selected from a list consisting of fabric, paper, gas-permeable polymeric capsule, gas-permeable polymeric particle, beeswax, paraffin, gelatine, polysaccharide gum, and mixtures thereof;

wherein the perforated external shell comprises a polymeric material, a metal and combinations thereof;

wherein the essential oil is selected from a list of oils comprising: eugenol, pulegone, and mixtures thereof; provided that the essential oil is used as an enhancer of the stored dried agricultural plant products protection.

In an embodiment the amount of essential oil in the device may be more than 20% (v/v, essential oil volume/total volume device), preferably the amount of essential oil is 50-70% ($V_{essential\ oil}/V_{device\ total}$).

In an embodiment the perforated external shell may be reusable, allowing opening and closing, facilitating the internal reservoir replacement at the end of its lifetime, in particular for exhaustion of the oil contained therein.

In an embodiment, the support material should allow fixation of the oil, releasing it exclusively in vapour form, with no liquid spillage. It may be a solid material in which the oil was previously dispersed using a physical mixture process, involving melting or dissolving the material in an appropriate solvent.

In an embodiment, this device is composed of an external perforated shell, that ensures that the oil does not contact directly with the stored product, and an internal reservoir that supports the oil. The external shell may be rigid and mechanically resistant, in order to prevent collapse or fracture during the container charging and discharging processes and during the storage period. The external shell should contain a large number of openings such as holes, slots, pores, etc., to enable an easy diffusion of the oil towards the container's atmosphere while preventing the stored product from entering the device.

In an embodiment the perforated external shell may be made of a polymeric material selected from the following list: such as polyvinyl chloride (PVC), low-density polyethylene (LDPE), high-density polyethylene (HDPE), polyethylene terephthalate (PET), polypropylene (PP), polystyrene (PS), polylactic acid (PLA), polycarbonate (PC) and combinations thereof, or metal (steel, brass, etc.). Preferably, the external perforated shell may be produced with a rigid biodegradable material, for example PLA, allowing its decomposition in composting conditions after being discarded.

In an embodiment, examples of possible materials used for the internal reservoir are: beeswax, paraffin, gelatine, polysaccharides gums, etc. This material may be as a single block or splitted in spherical, cylindrical or cubic particles, which should be larger than the openings of the external shell, to avoid losses and consequent mixture with the stored product.

In an embodiment, the oil may be impregnated in the support material, in particular a fabric or paper, properly packaged within the external shell. Preferably, the oil is confined within gas-permeable polymeric capsules, made for example of polyureas, polyesters, polyamides, polysaccharides, and their combinations.

In an embodiment, the internal support material may comprise particles or capsules with reduced size, they may be attached to a fabric, paper or other flexible substrate which allows an easy packaging within the external shell.

In an embodiment, the device may be packaged with a sealant film material in order to prevent oil losses before use. Preferably, said film may be easily removable by cutting, tearing, unsticking, etc., enabling oil evaporation and oil diffusion to the outside while the device is placed within the storage container.

In an embodiment, the device may have any for stored geometry, as long as it ensures easy handling and loading/unloading onto any container for stored products.

In an embodiment, the oil amount in each device may differ depending on the intended storage period, amount of stored product and type of stored product. The number of devices placed within each container may vary according to container size (24 mL essential oil/60 L/5 months).

In an embodiment, in larger containers more than one vertical line of devices may be introduced in different points in its interior, to achieve a level of oil(s) vapour saturation suitable for the container requirements. Its configuration will enable the natured atmosphere maintenance during handling of the container, including its opening and closing.

In an embodiment the dimension of said device for long-term storage is between 20-150 $cm^3$, preferably between 50-80 $cm^3$.

One aspect of the present subject-matter is related to a stored products container comprising the device for long-term storage of dried agricultural plant products of the present subject-matter.

In an embodiment the stored products container may have a dimension superior to 60 L, preferably superior to 100 L, more preferably superior to 300 L.

In an embodiment the stored products container may comprise at least 1 device for long-term storage for each 60 L of the container, preferably 2 devices for long-term storage, more preferably 3 devices for long-term storage. Depending on the container depth 1, 2 or 3 devices can be placed vertically (top, bottom and in the middle).

In an embodiment, the present device comprises a protective cage/shell, an internal part and it is made of an inert and biocompatible material. Furthermore, the device is easy to handle, to place or remove in any type of food container and it can be placed in any position of the container (bottom, middle, top). Its configuration enables the maintenance of the saturated atmosphere during the normal handling of the container, in particular opening and closing, protecting the stored products.

Food safety is a problem that concerns society nowadays. The current preservative techniques rely on the action of synthetic pesticides that can originate in some cases high residue levels and promote resistant strains. Therefore, a device able to contribute to the preservation and conservation of food, without the resource to synthetic pesticides is of importance to prolong the storage period and to avoid food intoxication and foodborne diseases. This is important worldwide and specially in developing countries.

As a result, the proposed technology allows:
increase of the storage period of stored products;
avoidance of synthetic pesticides;
avoidance of food intoxication;
safe and efficient environmental protection.

This disclosure envisages a protective methodology along the food storage period, based on the identified insecticidal, fungicidal or bactericidal properties of essential oils, combined with a controlled release system that will inhibit the contamination by insects, fungi and bacteria.

Another advantage of the present disclosure is that are no safety concerns on the use of essential oil to treat stored products against pests because the methodological system, here proposed, does not involve the direct contact of the active substances with the stored products.

The present disclosure relates the use of a device ready to use in containers for stored products. This device intend to exploit the potential of essential oil vapours for insecticide, fungicide and bactericide actions, using controlled release devices based on essential oils properties.

This disclosure relies on the propagation of the essential oil vapours into the container atmosphere, until saturation is reached, securing the foodstuff stability through the whole storage period. The device (either the protective enclosure either the internal part) will be made of an inert and biocompatible material, will be simple to handle and to place or remove in any type of food container and it can be placed in any position of the container (bottom, middle, top). Its configuration will enable the maintenance of the saturated atmosphere during the normal handling of the container (opening and closing).

Other aspects, embodiments, advantages and mode of application of the disclosure are apparent from the detailed description of this document.

Throughout the description and claims, the word "comprise" and variations of the word, are not intended to exclude other technical features, additives, components, or steps. Additional objectives, advantages and features of the solution will become apparent to those skilled in the art upon examination of the description or may be learned by practice of the solution.

BRIEF DESCRIPTION OF THE DRAWINGS

The following figures provide preferred embodiments for illustrating the description and should not be seen as limiting the scope of disclosure.

DETAILED DESCRIPTION

Figure 1:
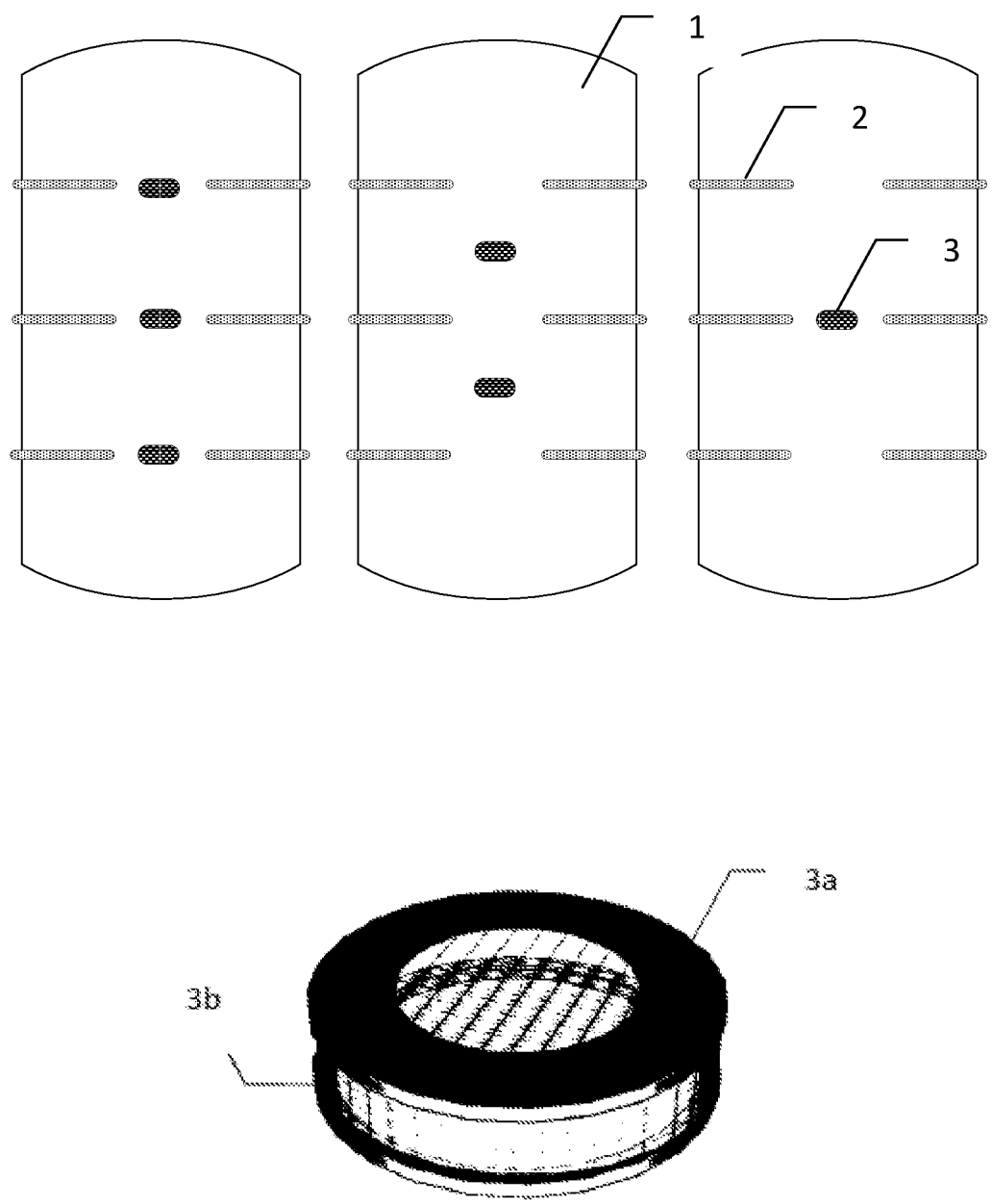
FIG. 1—Schematic representation of containers with the device now disclosed, wherein 1 represents a 65 L high density polyethylene container, in particular with 63 cm height and 36.5 cm in diameter; 2 represents a probe in the case of fungal and insecticidal study, in particular with a 3 cm diameter and 13 cm length, and the sampling point in the case of the study of the propagation profiles, in particular 9 mm in diameter and 16 cm length; 3 represents a protection device, in particular with 7 cm diameter and 3.3 cm height; 3a represents a brass metal structure of the outer shell and 3b represents a metallic net stainless-steel outer shell.

The present disclosure relates to a method for controlling insects and microorganisms in stored products consisting of a controlled release system of plant essential oils combining the encapsulation of essential oils in biocompatible microstructures, a physical support/biocompatible screen for fixing/impregnating the microparticles containing the essential oils and a device for containment the structure impregnated with the essential oils. This system is characterized by being suitable for use in storage containers and under confined environment. This system is suitable for long time period storage of stored products.

The present disclosure relates to a device, in particular a delivery device to be placed within a container for stored products. This device explores the insecticidal and fungicidal properties of essential oils using sustained release devices in a confined environment.

This disclosure is based on the propagation property of essential oils vapours inside storage containers for stored products in an amount sufficient to reach vapour stabilization, ensure sterility of the environment, without altering the quality of stored products throughout the storage period.

Therefore, this disclosure relates to the design of a protection system for long period stored products, preferably dried foods, more preferably grains, the most preferably dried cereal grains and pulses.

In an embodiment, this protective device involves the use of plant essential oils evidencing protection against insets and fungi.

In an embodiment, the protection system of the present disclosure allows the use of one, two, or even more essential oils combined in order to improve the efficacy of the protection system or to control one or more undesired pests.

In an embodiment, this disclosure also includes the design of the delivering device for the sustained release of the essential oils in closed containers of medium volume with a dimension superior to 60 L, preferably from 60 to 300 L, more preferably from 60 to 150 L, even more preferably 60 to 100 L of capacity.

In an embodiment, the device described herein supports the material containing the oil or oil mixture in its interior and allows the subsequent propagation of the oil inside the container by diffusion in the gaseous atmosphere present in the interstitial spaces of the stored product. The oil concentration in the gaseous atmosphere increases till reaching the saturation point correspondent to pressure and temperature conditions inside the container.

In an embodiment of the present disclosure, essential oils from aromatic plants containing high contents of eugenol and/or pulegone may be used.

In an embodiment, the essential oils of *Syzygium aromaticum* (dove) and *Mentha pulegium* (pennyroyal) are preferred (Table 1). Still preferably the compounds eugenol and pulegone can also be used.

In an embodiment, dove and pennyroyal essential oils were selected based on their pesticide potential and their environmental safeness.

TABLE 1

Chemical composition (%) of Pennyroyal (*Mentha pulegium*) and Clove (*Syzygium aromaticum*) obtained by GC-MS

| | % Components | |
| --- | --- | --- |
| Components | Mentha pulegium | Syzygium aromaticum |
| 3-Methyl cyclohexanone | 0.3 | — |
| α-Pinene | 0.5 | — |
| 1,8-Cineole | 0.1 | — |
| Sabinene | 0.1 | — |
| β-Pinene | 0.4 | — |
| 3-Octanol | 0.8 | — |
| Limonene | 0.9 | — |

TABLE 1-continued

Chemical composition (%) of Pennyroyal (*Mentha pulegium*)
and Clove (*Syzygium aromaticum*) obtained by GC-MS

| Components | % Components | |
|---|---|---|
| | *Mentha pulegium* | *Syzygium aromaticum* |
| Terpinolene | 0.1 | — |
| Menthone | 0.3 | — |
| p-Menth-3-en-8-ol* | 0.8 | — |
| Isomenthone | 0.2 | — |
| Cis-Isopulegone | 2.5 | — |
| Pulegone | 86 | — |
| Piperitenone | 2.2 | — |
| B-Caryophyllene | 0.7 | 13.4 |
| α-Humulene | 1.1 | 1.5 |
| β-Caryophyllene oxide | 0.1 | 0.4 |
| Humulene epoxide* | 0.2 | 0.1 |
| Methyl salicylate | — | 0.1 |
| Eugenol | — | 78.1 |
| α-Cubebene | — | 0.1 |
| α-Copaene | — | 0.3 |
| Eugenol acetate | — | 5.2 |
| trans,trans-α-Farnesene | — | 0.1 |
| trans-Calamenene | — | 0.1 |
| δ-Cadinene | — | 0.1 |

*Identification based on Mass Spectra only

In an embodiment, additional essential oils from other plants can be used, in particular provided that in its composition more than 40% (w/w, mass of active component mass of essential oil) of pulegone and/or eugenol are present.

In an embodiment, pulegone and eugenol commercially available can be used.

Tables 1 and Table 2, summarize the richness in pulegone and eugenol, respectively, of some plant essential oils (Essential Oil DataBase of National Institute of Plant Genome Research http://nipgr.res.in/Essoildb/index.html), that can be use in the present disclosure.

TABLE 2

Plant essential oil rich in pulegone.

| Plant species | Plant part | Content of pulegone (%) ($w_{pulegone}/w_{total\ oil\ composition}$) |
|---|---|---|
| *Acinos suaveolens* | aerial part | 67.70 |
| *Calamintha nepeta* ssp. var. *subisodonda* | aerial part | 75.50 |
| *Calamintha nepeta* | aerial part | 41.00 |
| *Cunila angustifolia* | leaf | 56.50-72.30 |
| *Hedeoma mandoniana* | aerial part | 43.20 |
| *Hedeoma multiflorum* | aerial part | 66.00 |
| *Hedeoma multiflorum* | aerial part | 62.10 |
| *Micromeria thymifolia* | aerial part | 50.40 |
| *Minthostachys verticillata* | leaf and stem | 63.00 |
| *Mintosthachys mollis* | leaf | 42.80 |
| *Satureja abyssinica* | aerial part | 43.50 |
| *Satureja brownei* | flower | 54.63 |
| *Satureja odora* | leaf and flower | 41.60 |
| *Ziziphora clinopodioides* ssp. *rigida* | aerial part | 45.80 |

TABLE 3

Plant essential oil rich in eugenol.

| Plant species | Plant part | Content of eugenol (%) ($w_{eugenol}/w_{total\ oil\ composition}$) |
|---|---|---|
| *Hyptis recurvata* | leaf | 68.80 |
| *Marrubium vulgare* | aerial part | 2.10-50.10 |
| *Ocimum basilicum* | leaf | 9.49-41.20 |
| *Ocimum basilicum* | herb | 2.90-43.20 |
| *Ocimum gratissimum* chemovar. 1 | leaf | 75.40 |
| *Ocimum gratissimum* | apical part of branches | 52.80-63.60 |
| *Ocimum gratissimum* | leaf | 68.81 |
| *Ocimum micranthum* | leaf | 46.55 |
| *Ocimum sanctum* | leaf | 53.40 |
| *Origanum micranthum* | leaf | 72.90-90.40 |
| *Pimento dioica* | leaf | 45.40-83.68 |

Several bioassays were conducted. The biological assays, both in vitro and in vivo, were performed in order to confirm the fungicidal and insecticidal potential of the essential oils obtained from clove and pennyroyal and that of their major compounds eugenol and pulegone, respectively.

Limonene, used as an insecticide and insect repellent, found in many oils and fruits including orange, lemon, grapefruit, berry, leaf, caraway, dill, bergamot, peppermint and spearmint oils was also included in the present disclosure just as reference. The Federal and Drug Administration determined that limonene products, labelled and used as specified in this Registration Eligibility Decision, will not pose unreasonable risks or adverse effects to humans or the environment.

The fungi studied were *Aspergillus candidus, A. niger, Fusarium culmorum* and *Penicillium islandicum*. They were obtained from the IICT Mycology laboratory.

The insects studied were *Sitophilus zeamais* and *Acanthoscelides obtectus*, obtained from the IICT Entomological laboratory.

Maize and bean samples were not sprayed with any pesticide.

Example 1—Antifungal Activity Tests

The screening of *S. aromaticum* and *M. pulegium* essential oils and their major components, eugenol and pulegone, respectively, was carried out using a direct plating technique in order to evaluate their ability to inhibit the growth of *Aspergillus candidus, A. niger, Penicillium islandicum* and *Fusarium culmorum*.

In vitro assays. For the determination of direct plating effect of essential oil on the growth of the fungi on different concentrations 0.5, 1.0, 2.5 and 5.0 μL/mL of essential oil were put on the surface of a Petri dish with 20 mL of potato dextrose agar medium (PDA). These Petri dishes were inoculated with a 5 mm diameter disk of fungi grown on PDA medium for 8 days at 28° C. This disk was placed on the agar surface and the dish sealed immediately with parafilm to prevent loss of essential oil to the atmosphere and incubated at 28° C. Inhibition concentrations of essential oil were determined by periodic evaluation of fungi growth during 25 weeks. For each concentration, four replicate dishes were used.

For the determination of volatile phase effect of essential oil on the growth of the fungi different concentrations 1.0, 2.5 and 5.0 μL/mL of essential oil were added to sterile filter papers (10 mm diameter, Whatman No. 1 and placed adherent to the inner surface of each Petri dishes lid (90 mm)). Petri dishes were inoculated with a 5 mm diameter disk of fungi grown on PDA medium for 8 days at 28° C. This disk was placed on the agar surface and the dish sealed immediately with parafilm and incubated at 28° C. Inhibition concentrations of volatile phase of essential oils were determined by a periodic evaluation the fungi growth over 25 weeks. In the control, equal amounts of sterilized water was added to filter papers and placed onto the lid of Petri dishes. For each concentration, four replicate Petri dishes were used. The absence of growth was recorded during 25 weeks. The results are show in table 4.

determination of volatile phase effect of essential oil on fungi growth different concentrations of essential oil were added to sterile filter papers (10 mm diameter, Whatman No. 1), namely, 0.5 µL/mL, 1.0 µL/mL, 2.5 µL/mL and 5.0 µL/mL and placed adherent to the inner surface of each Petri dishes lid (90 mm).

The grains were disinfected at surface as describe by Pitt & Hocking (Pitt, J. I., Hocking, A. D., 2009. Fungi and food spoilage. Springer, New York).

TABLE 4

Increased period of storage without any fungal contamination using two techniques of essential oils application: direct plating and in vitro under saturated atmospheres (vapour phase)

| EO/MAC | | Conc. µL/mL | Time (weeks) | | | |
|---|---|---|---|---|---|---|
| | | | Aspergillus candidus | Aspergillus niger | Fusarium culmorum | Penicillium islandicum |
| Syzygium aromaticum | Direct plating | Control | 1 | 1 | 1 | 1 |
| | | 0.5 | 25 | 25 | 25 | 25 |
| | | 1.0 | 25 | 25 | 25 | 25 |
| | | 2.5 | 25 | 25 | 25 | 25 |
| | | 5.0 | 25 | 25 | 25 | 25 |
| | Vapour phase | Control | 1 | 1 | 1 | 1 |
| | | 0.5 | 23 | 24 | 25 | 25 |
| | | 1.0 | 25 | 25 | 25 | 25 |
| | | 2.5 | 25 | 25 | 25 | 25 |
| | | 5.0 | 25 | 25 | 25 | 25 |
| Mentha pulegium | Direct plating | Control | 1 | 1 | 1 | 1 |
| | | 1.0 | 10 | 11 | 25 | 25 |
| | | 2.5 | 25 | 15 | 25 | 25 |
| | | 5.0 | 25 | 25 | 25 | 25 |
| | Vapour phase | Control | 1 | 1 | 1 | 1 |
| | | 1.0 | 7 | 6 | 25 | 25 |
| | | 2.5 | 15 | 13 | 25 | 25 |
| | | 5.0 | 25 | 25 | 25 | 25 |
| Eugenol | Direct plating | Control | 1 | | | |
| | | 0.5 | 25 | 25 | 25 | 25 |
| | | 1.0 | 25 | 25 | 25 | 25 |
| | | 2.5 | 25 | 25 | 25 | 25 |
| | | 5.0 | 25 | 25 | 25 | 25 |
| | Vapour phase | Control | 1 | 1 | 1 | 1 |
| | | 0.5 | 21 | 23 | 25 | 25 |
| | | 1.0 | 25 | 25 | 25 | 25 |
| | | 2.5 | 25 | 25 | 25 | 25 |
| | | 5.0 | 25 | 25 | 25 | 25 |

1.2 In vivo tests. The efficacy screening of the vapour of clove and pennyroyal essential oils (OE) and their main active components (MAC) eugenol, pulegone or their mixture was, carried out using a modified technique describe in Bluma, R., Landa, M. F., Etcheverry, M., 2009. Impact of volatile compounds generated by essential oils on *Aspergillus* section Flavi growth parameters and aflatoxin accumulation. J. Sci. Food Agric. 89 (9), 1473-1480. For the Ten dried grains were placed on Petri dishes with 20 mL of PDA medium with chloramphenicol (1%). These dishes were sealed immediately with parafilm and incubated at 28° C. Inhibition concentrations of volatile phase of essential oils were determined by periodic observation of fungi growth over 25 weeks. Control with no treated grains was also performed. For each concentration ten replicates were done.

TABLE 5

Increased period of storage without any fungal contamination tested in vivo under satured atmospheres (vapour phase).

| | Conc. (µL/mL) | Time (weeks) | | | | |
|---|---|---|---|---|---|---|
| | | Syzigium aromaticum | Eugenol | Mentha pulegium | Pulegone | Eugenol:Pulegone |
| Vapour phase | Control | 1 | 1 | 1 | 1 | — |
| | 0.5 | 2 | 2 | 2 | 2 | — |
| | 2.5 | 5 | 25 | 20 | 20 | — |
| | 5.0 | 25 | 25 | 25 | 25 | — |
| | Control | — | — | — | — | 1 |
| | 0.25:0.25 | — | — | — | — | 1 |
| | 0.50:0.50 | — | — | — | — | 10 |

TABLE 5-continued

Increased period of storage without any fungal contamination tested in vivo under satured atmospheres (vapour phase).

| Conc. (μL/mL) | Syzigium aromaticum | Eugenol | Mentha pulegium | Pulegone | Eugenol:Pulegone |
|---|---|---|---|---|---|
| | | | Time (weeks) | | |
| 0.25:0.75 | — | — | — | — | 3 |
| 0.75:0.25 | — | — | — | — | 25 |

Example 2—Insecticidal Activity Tests

Maize grain with an average moisture content of 14±0.5% and ten unsexed adult insects aged from 1 to 4 days were used. The stock cultures of insects and the biological tests were carried out in a single incubator at 27° C. and 75±5% relative humidity.

Assay Procedures

Different concentrations of essential oil were added to sterile filter papers, for the determination of volatile phase effect of essential oil on insect growth (20 mm diameter, Whatman No. 1), 18.8 μL/mL of S. aromaticum and pulegone (for maize) and 7.5 μL/mL of eugenol, pulegone, limonene and 5.6:5.6 μL/mL for the mixtures eugenol:pulegone and eugenol:limonene (for beans), and placed adherent to the inner surface of each plastic jars of 25 mL; 10 g of stored product (maize or bean) and 10 unsexed adult insects aged from 1 to 4 days old were introduced in the plastic jars, which were hermetically sealed with parafilm. Control with non-treated samples was also performed. Ten replicates per treatment and control were set up. All the replicates were kept in an incubator at 27° C. and 75%±5% relative humidity.

The progeny (F1) was evaluated monthly by common procedures after removing the parent adults. Insect mortality was assessed during five months (0.25, 1, 8, 134 and 149 days). The development index and the life cycle were also evaluated.

Figure 2:
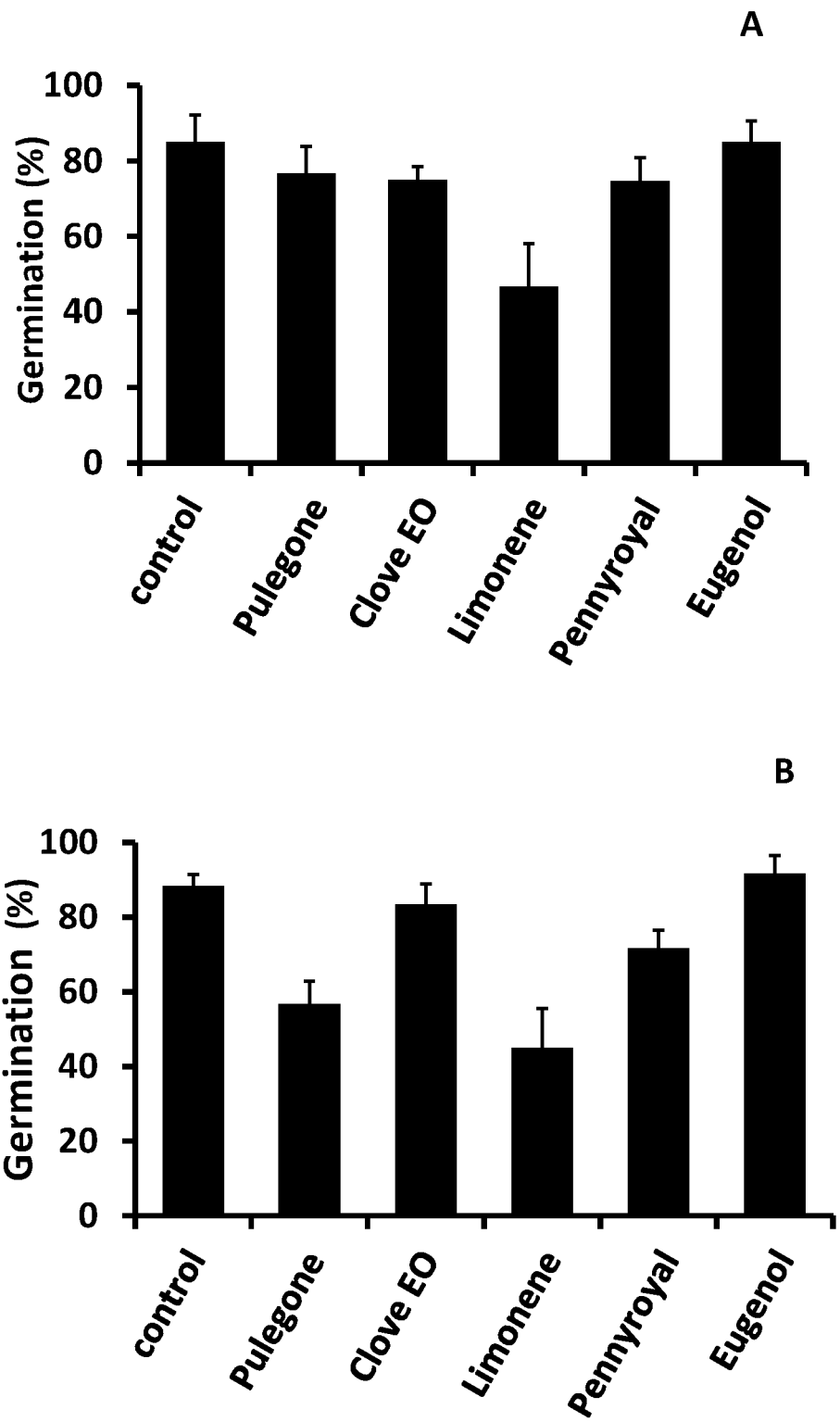
FIG. 2—Represents the effect of 3.5 months treatments on grain maize germination: (A) in vitro after 4 days and (B) in vivo 17 days after sowing (DAS).

Example 3—Effects of Treatments on the Germination and the Seedling of the Reference Stored Products Example 3.1—In Vitro Germination In an embodiment, for the in vitro germination assay were used 10 seeds and 5 ml of sterile water per petri dish and the incubation temperature was ±25° C. The treatments related to methods of the present disclosure do not induce any significant change on seed germination capacity. In the other hand, when limonene was used a significant decrease on germination was observed (FIG. 2A).

Example 3.2—In Vivo Effects

Figure 3:
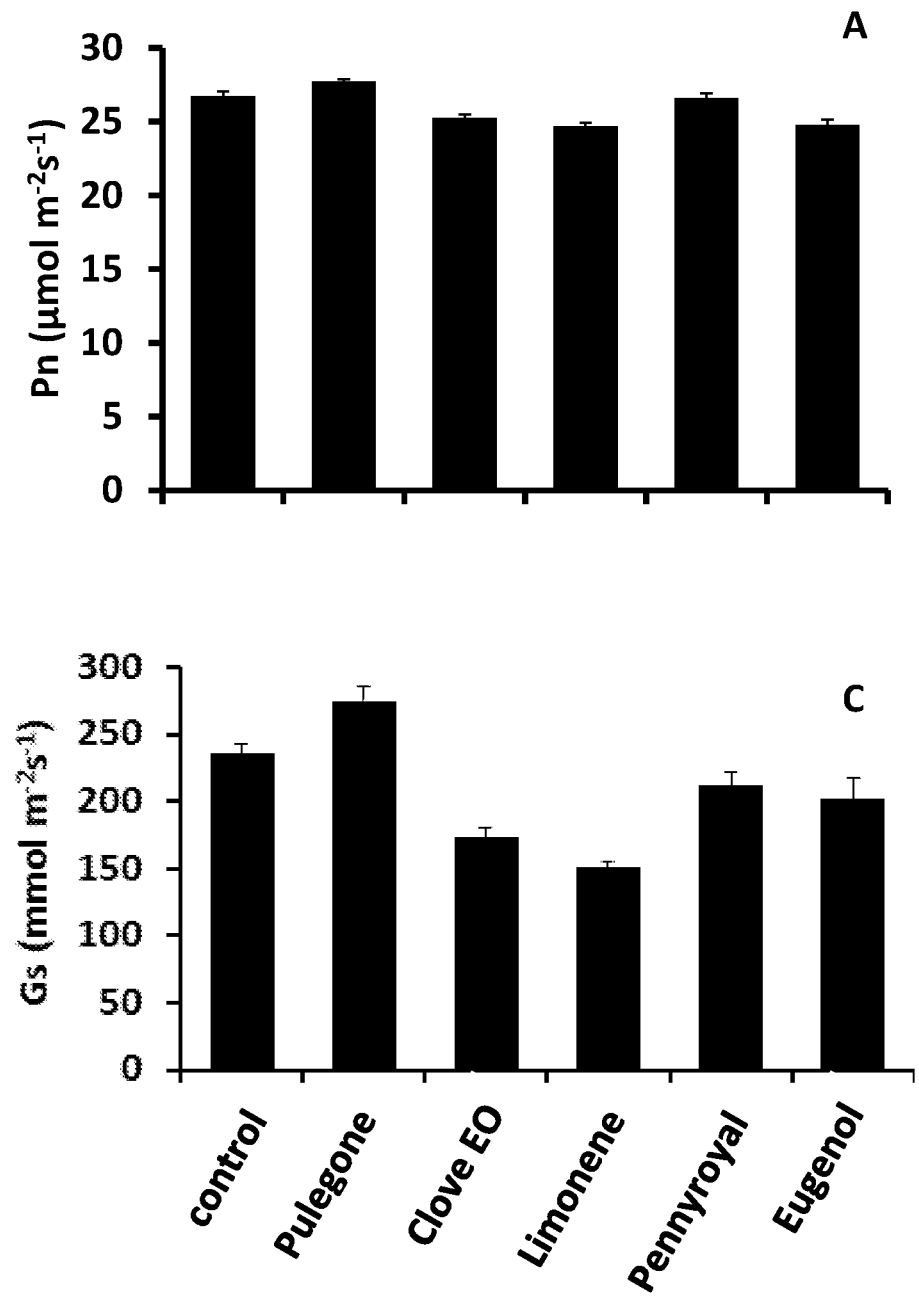
FIG. 3—Represents the effects of treatments on some physiological parameters: A—net photosynthesis, B—total chlorophyll, C—stomatal conductance and D—transpiration rate.
Figure 3:
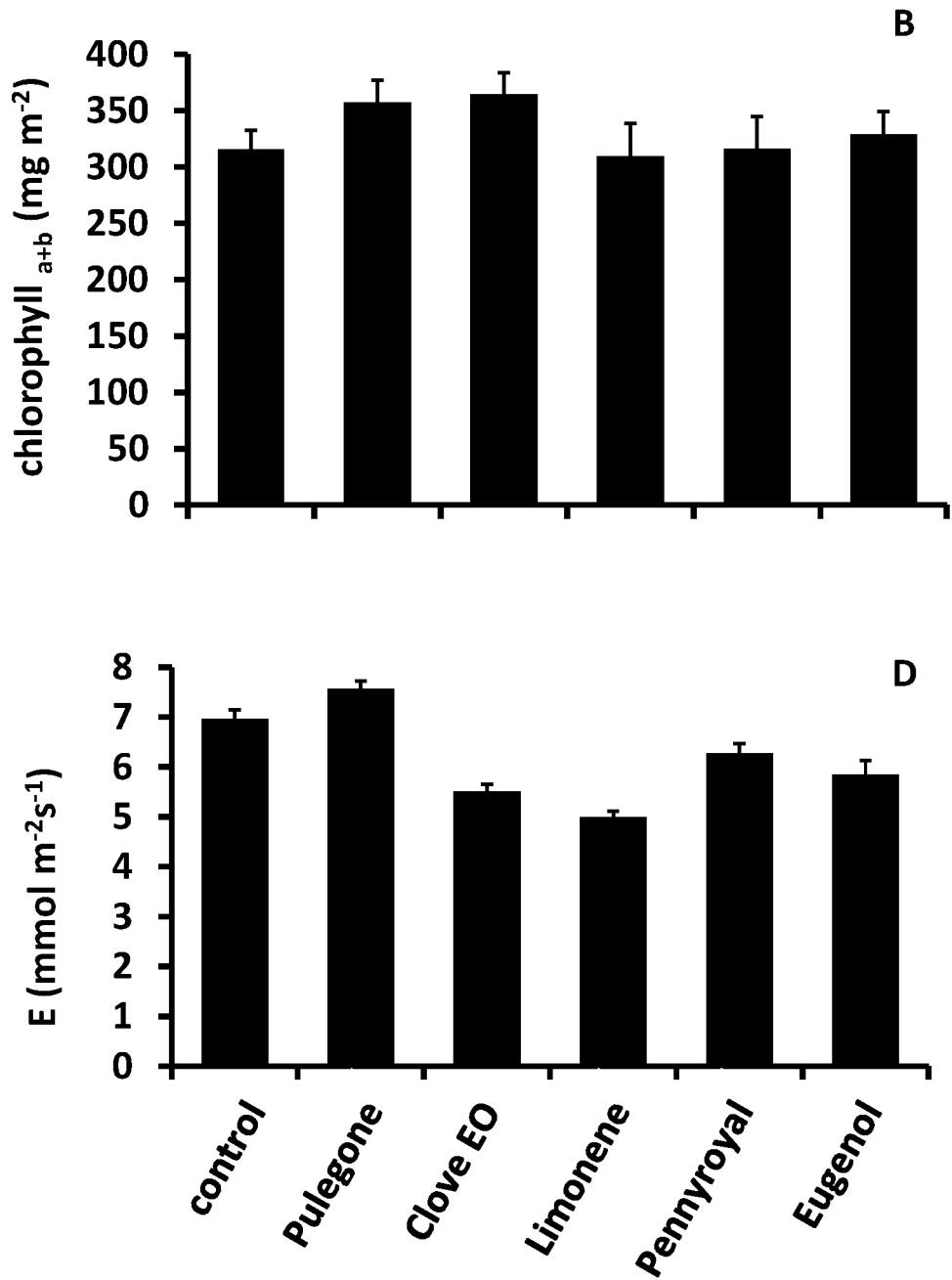

In an embodiment, the assay was performed in pots in a greenhouse with environmental monitoring (temperature, humidity and PAR intensity) and controlled irrigation. For each treatment, 6 pots with 2 plants each were used. Plants produced from treated seeds did not show significant differences on the life cycle in relation to the control without any treatment. No relevant differences in phenotypic (germination, chlorophyll and height) and physiological parameters (photosynthesis, stomatal conductance and transpiration (FIG. 3) were found.

Treatment with eugenol showed a similar result on germination. All the other modalities induced a slight decrease, except limonene, used as reference that really affected the germination (49.1%).

Plants obtained from grains treated with limonene were the only ones with a small decrease (1.9%) in total chlorophyll content related to the control. All plants from the seeds

TABLE 6

Increased the period of storage without any insect contamination tested in vitro under saturated atmospheres (vapour phase).

| Insect | Stored product | | Conc. (μL/mL) | 0.25 | 1 | 8 | 134 | 149 |
|---|---|---|---|---|---|---|---|---|
| | | | | | | Days | | |
| | | | | Insect Mortality (%) | | | | |
| Sitophilus zeamais | Maize | Control | — | 0 | 0 | 0 | 0 | 0 |
| | | Syzigium aromaticum | 18.8 | 23 | 28 | 92 | 100 | 100 |
| | | Pulegone | 18.8 | 46 | 100 | 100 | 100 | 100 |
| Acanthoscelides obtectus | Bean | Control | — | 0 | 29 | 100 | 100 | 100 |
| | | Eugenol | 7.5 | 0 | 70 | 100 | 100 | 100 |
| | | Pulegone | 7.5 | 0 | 100 | 100 | 100 | 100 |
| | | Limonene | 7.5 | 0 | 100 | 100 | 100 | 100 |
| | | Eugenol:Pulegone | 5.6:5.6 | 0 | 20 | 100 | 100 | 100 |
| | | Eugenol:Limonene | 5.6:5.6 | 0 | 100 | 100 | 100 | 100 |

Pulegone efficacy was very high for S. zeamais and A. obtectus, after one day, 100% mortality for concentrations of 18.8 e 7.5. μL/mL, respectively.

submitted to treatments with the bioactive products here proposed, showed good growth parameters and good usefulness for the object of present disclosure.

Figure 4:
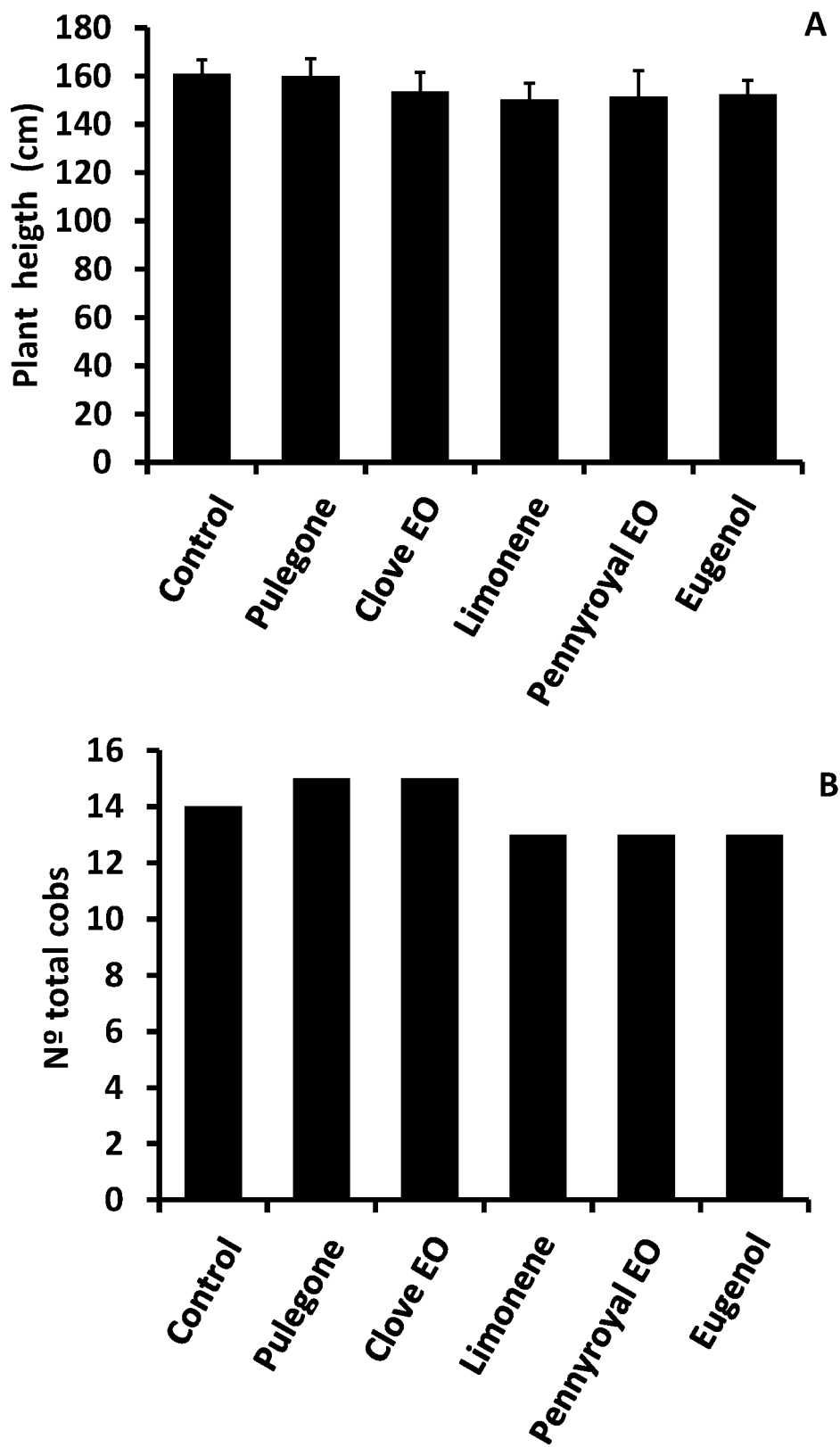
FIG. 4—Represents the effects of treatments with essential oils on some plant growth parameters.
Figure 5:
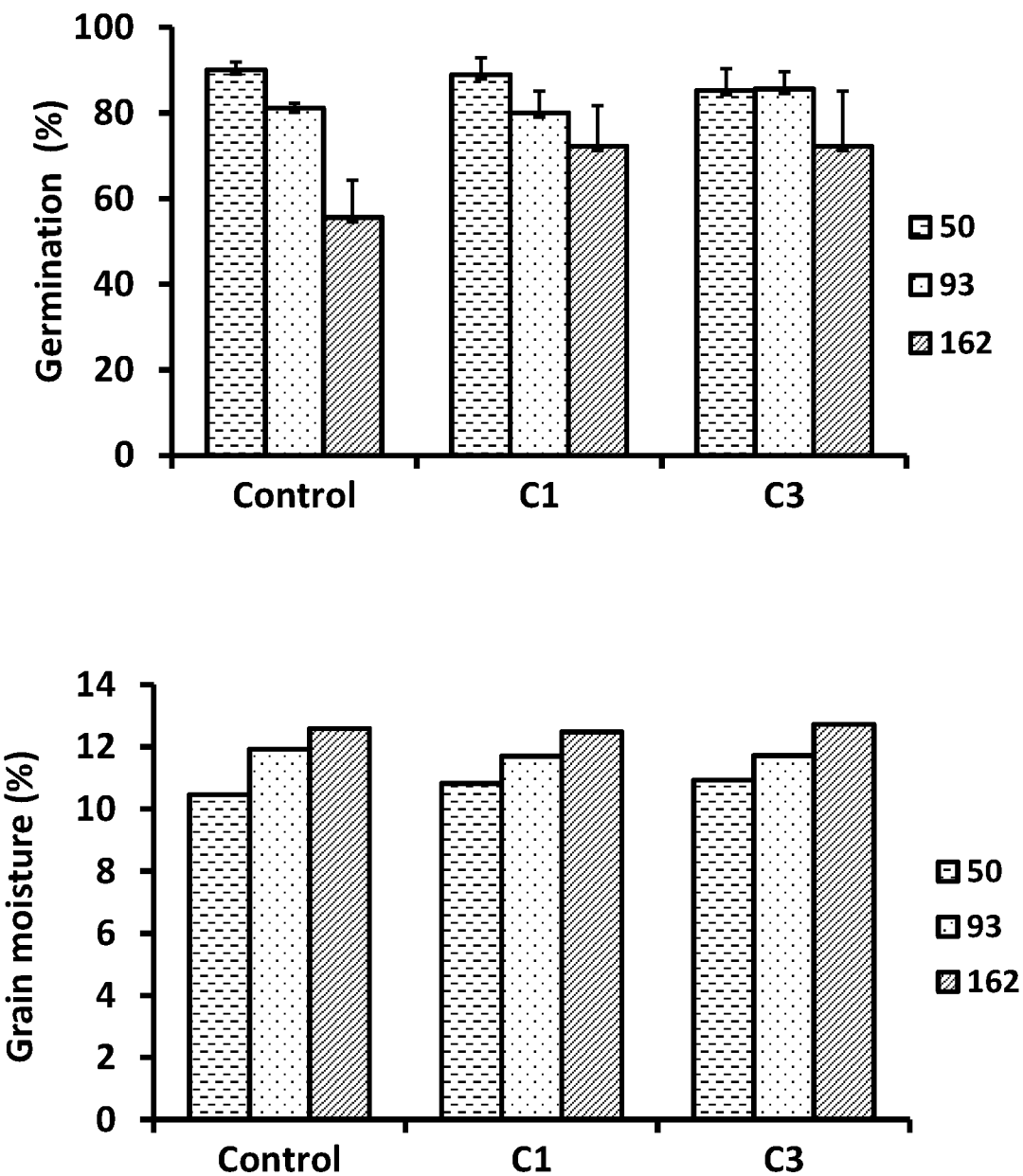
FIG. 5—Represents the time course of germination capacity and grain moisture during 50, 93 and 162 days of storage in the 2 containers with 1 (C1) and 3 (C3) essential oils released devices.

In what concerns to the height of plants (FIG. 4A), only the plants from seeds treated with limonene showed a small variation relatively to the control. The number of cobs (4B) obtained shows that the plants productivity was not affected by any treatment.

Example 4—Real Scale Tests

In an embodiment, the mechanism of action and efficiency behind the disclosure was supported by conducting three studies in simultaneously: evaluation of the fungicidal and insecticidal activity performance; evaluation of the treated seed germination; main components vapour propagation profile measurement and monitoring in an ecosystem/full scale storage situation.

The ecosystem considered for this demonstration reproduced the maize storage during 4/5 months at 25° C. in a high-density polyethylene container with 65 L. The device (s) was packaged into the grains bed during container filling with the dried product stored.

Example 4.1—Fungicidal and Insecticidal Activity

In an embodiment, for the evaluation of essential oils insecticidal and fungicidal activity in stored grain protection and germination 2 hypotheses were considered, using 1 or 3 release devices in each container (FIG. 1) plus one container without device (control).

The device is composed by a metal shell with a porous stainless steel mesh supported in a cylindrical brass structure (FIG. 1). Two cotton semicircles were impregnated individually with 12 mL of clove oil and the other with 12 mL of mint-pennyroyal oil and placed in the internal shell.

Each container had 6 side probes (distributed according to FIG. 1), used to evaluate the essential oils insecticidal activity in the evolution of insects S. zeamais life cycle. 36 days after the grain storage with the release devices containing OE, insects, 10 unsexed adults aged from 1 to 4 days old, were placed in these probes together with 10 g of maize. Independently the number of release devices present in the containers (1 or 3), an insect average mortality of 30% was observed after 50 days after the initial maize storage, in opposite to 0% of mortality in the control assay. Comparing the containers with 1 and 3 devices, the mortality % increased after 30 days, nearly doubled in the container with 3 devices (47% and 63%, respectively). Concerning the infestation level, the container with one central device reduced by 23% the progeny number (F1) when compared with the control assay (only 167 to 217), while with 3 devices was observed an increase to 33% (only 145 to 217).

After 30 days of assays, the container with 3 devices showed an insect average mortality of 63%, while the container with 1 device showed 47% of mortality.

The F1 insect mortality shows a dependence on the number of devices placed in the container. After 30 days of assay, the container with 1 device showed 47% of mortality and the container with 3 devices exhibited 63% of mortality. The mortality observed in the control assay is related to natural mortality The fungicidal effect of essential oils vapour was evaluated on maize samples withdrawn from the container interior with a vertical probe, which allows sampling at any depth of the grain bed.

After 36, 50 and 90 days of cereal storage, no fungi development was observed inside containers. After grains observation under laboratory conditions and appropriated culture media (PDA) the fungistatic effect of essential oils was confirmed.

Example 4.2—Treated Seeds Germination Capacity

In an embodiment, after 50 days of storage, in the 2 containers with the EOs release devices, the grains showed the same germination rate than the observed in the control assay (between 83-90%). This trend is still found after 93 days of storage (80%) and after 5 months (70%), which indicates that these types of treatments allowing the maintenance of the germination capacity during storage.

Example 4.3—Container Atmosphere Composition

To study the evolution of the spatial and temporal pulegone concentration, two containers with 1 and 2 release devices were used, similar to those described in 4.1. In each container, 24 ml of pulegone were impregnated in cotton.

The spatial concentration profiles along time were outlined by collecting over time samples of 500 µL from the container atmosphere, through the 6 sampling ports (detailed presentation in FIG. 1) using a 500 µL gas-tight Hamilton syringe.

The composition of the samples was measured in a Dani Master GC-PID, equipped with a Varian CP-8944 Column (30 m×0.25 mm I.D.) according to the following operating conditions: injector temperature at 100° C. with a 1:15 split ratio, detector temperature at 200° C.; initial column temperature of 60° C., subsequently increased to 120° C. at a rate of 10° C./min, and held isothermal for 10 minutes, then increased to 190° C. at a heating rate of 25° C./min, held isothermal for 5 minutes. Nitrogen was used as carrier gas at a constant 2 mL flow rate.

After 20 days of storage time, the spatial concentration profiles of pulegone indicated a complete stabilization in the entire container atmosphere at a concentration level corresponding to 10% of the standard pulegone saturation value, either using one or two devices. These values were maintained during all the storage period (4/5 months).

Considering the results from the insecticide assays (section 4.1), it may be assumed that these concentration levels granted an effective protection against the insect development. This explains why all containers exhibited the same average mortality 50 days after the beginning of the experiment (15 days after placing the insects in containers probes).

Example 5—Determination of Essential Oils Retention Level in Maize

Figure 6:
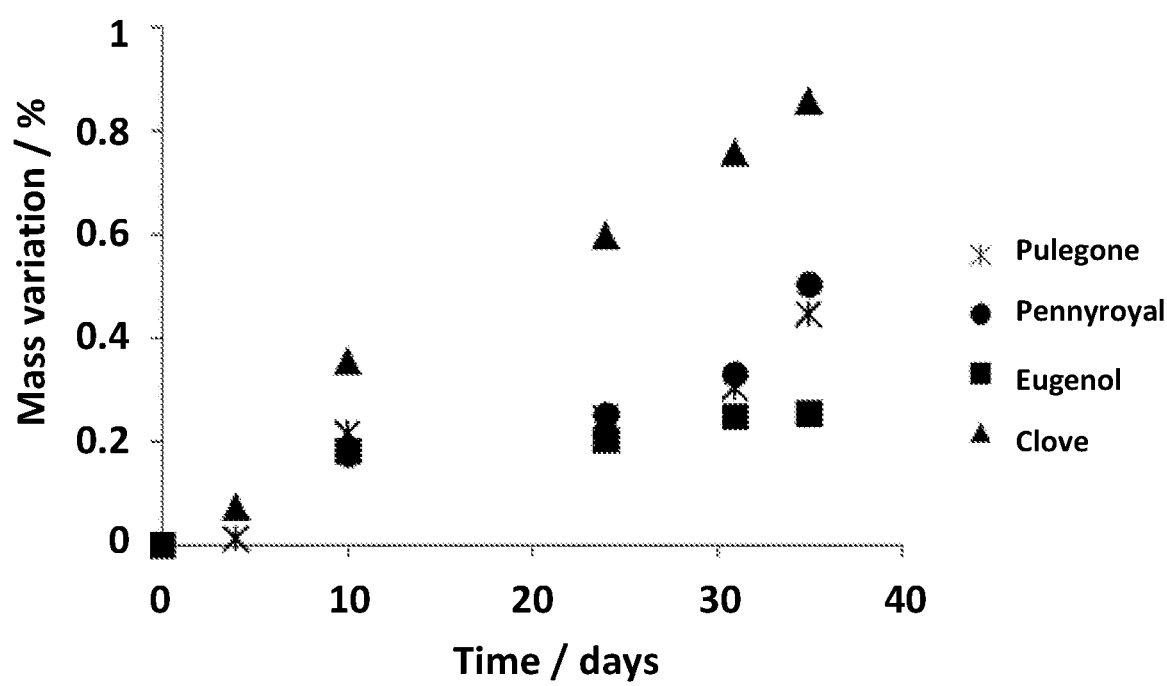
FIG. 6—Represents the maize mass variation towards the main active components of essential oil (MAC)—eugenol and pulegone, or their mixture—and essential oils vapours along 35 days of exposure.

In an embodiment, the measurement of the oils vapour retention coefficient on the maize grains was performed using around 30 g maize packed in perforated Petri dishes. These dishes were placed inside a sealable recipient at a 25° C., which contained, at the bottom, a vessel filled with essential oils liquid. This arrangement provided the ideal conditions for the evaporation and saturation of the atmosphere of the recipient promoting the contact between the essential oils vapour and the grains. This procedure was reproduced for both essential oils and their main active components (eugenol and pulegone, or their mixture). The mass retention of the essential oils in the grains was monitored by weighting the grains over time (FIG. 6).

The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. A method of enhancing long-term protection of an agricultural product, comprising:
   storing the agricultural product in a dried form; and
   exposing the stored agricultural product to an essential oil, wherein the essential oil includes both eugenol and pulegone, wherein the agricultural product is stored for at least four weeks.

2. The method of claim 1, wherein the agricultural product is stored for at least eight weeks.

3. The method of claim 1, wherein the combination of the eugenol and the pulegone have a concentration of at least 40 weight percent of the essential oil.

4. The method of claim 1, wherein the stored dried agricultural product comprises at least one of a cereal, a pulse, and a nut.

5. The method of claim 1, wherein the stored dried agricultural product comprises at least one of rice, a bean, maize, rye, whey, wheat, and a nut.

6. The method of claim 1, wherein the essential oil includes at least one of a stabilizer, an antioxidant, and a food dye.

7. The method of claim 6, wherein an antioxidant is added to the essential oil and the antioxidant added includes at least one of butylated hydroxytoluene, ascorbyl palmitate, calcium disodium ethylenediamine-tetraacetate, sorbic acid, 4-Hydroxymethyl-2,6-di-tert-butylphenol, monoglyceride citrate, 2,4,5 trihydroxybutyrophenone; tertiary butylhydroquinone, and 2,4,5-Trihydroxybutyrophenone.

8. The method of claim 1, wherein the essential oil is derived from a plant.

* * * * *